(12) United States Patent
Paiva et al.

(10) Patent No.: US 9,345,048 B2
(45) Date of Patent: May 17, 2016

(54) RANDOM ACCESS DATA CHANNEL FOR MACHINE TYPE COMMUNICATIONS

(75) Inventors: Rafael Cauduro Dias Paiva, Brasilla (BR); Robson Domingos Vieira, Brasilla (BR); Mikko Saily, Sipoo (FI)

(73) Assignees: Nokia Technologies Oy, Espoo (FI); Nokia do Brasil Tecnologia LTDA, Manaus-Amazonas (BR)

( * ) Notice: Subject to any disclaimer, the term of this patent is extended or adjusted under 35 U.S.C. 154(b) by 408 days.

(21) Appl. No.: 13/065,873

(22) Filed: Mar. 30, 2011

(65) Prior Publication Data
US 2012/0250630 A1    Oct. 4, 2012

(51) Int. Cl.
*H04W 4/00*        (2009.01)
*H04W 74/08*       (2009.01)
*H04W 60/00*       (2009.01)

(52) U.S. Cl.
CPC .......... *H04W 74/0833* (2013.01); *H04W 4/005* (2013.01); *H04W 60/00* (2013.01)

(58) Field of Classification Search
None
See application file for complete search history.

(56) References Cited

U.S. PATENT DOCUMENTS

2010/0323736 A1    12/2010    Fischer et al. ................ 455/509

FOREIGN PATENT DOCUMENTS

EP    2365678 A1    9/2011

OTHER PUBLICATIONS

"Details of latency reduction alternative", Ericsson, 3GPP TSG-RAN WG2 #69, R2-101332, Feb. 2010, 2 pgs.
"Graceful RACH Overload Relief", Telefon AB, et al., .3GPP TSG GERAN #46, GP-100896, Apr. 2010, 13 pgs.
"Hybrid MTC Channel", Nokia Siemens Networks, et al., 3GPP TSG GERAN #48, GP-101879, Nov. 2010, 6 pgs.
"Downlink CCCH Capacity Evaluation for MTC", Telefon AB, et al., 3GPP TSG GERAN #46, GP-100893, Apr. 2010, 8 pgs.
"$3^{rd}$ Generation Partnership Project; Technical Specification Group GSM/EDGE Radio Access Network; Physical layer on the radio path; General description (Release 9)", 3GPP TS 45.001 V9.0.0, May 2009, 43 pgs.
"$3^{rd}$ Generation Partnership Project; Technical Specification Group Radio Access Network; Physical layer procedures (FDD) (Release 10)", 3GPP TS 25.214 V10.1.0, Dec. 2010, 99 pgs.
"$3^{rd}$ Generation Partnership Project; Technical Specification Group Radio Access Network; Evolved Universal Terrestrial Radio Access (E-UTRA); Physical channels and modulation (Release 10)", 3GPP TS 36.211 V10.0.0, Dec. 2010, 103 pgs.
"$3^{rd}$ Generation Partnership Project; Technical Specification Group Services and System Aspects; Service requirements for Machine-Type Communications (MTC); Stage 1 (Release 10)", 3GPP TS 22.368 V10.2.0, Sep. 2010, 22 pgs.

(Continued)

*Primary Examiner* — Willie J Daniel, Jr.
(74) *Attorney, Agent, or Firm* — Harrington & Smith

(57) ABSTRACT

The exemplary embodiments of this invention reduce signaling overhead for machine type communications (MTC) devices that are assumed to transmit small messages and that have no or limited mobility. By using these assumptions, the exemplary embodiments of this invention provide a random access procedure for MTC devices to send small messages via a random access data channel (RADCH). An exemplary method includes: obtaining a subscription for a MTC device to use, for a period of time specified by the subscription, a RADCH to a wireless communication network; and transmitting bursts containing data on the RADCH in accordance with the subscription.

18 Claims, 8 Drawing Sheets

OBTAINING A SUBSCRIPTION FOR A DEVICE TO USE, FOR A PERIOD OF TIME SPECIFIED BY THE SUBSCRIPTION, AN UPLINK RANDOM ACCESS DATA CHANNEL TO A WIRELESS COMMUNICATION NETWORK — 8A

TRANSMITTING BURSTS CONTAINING DATA ON THE RANDOM ACCESS DATA CHANNEL IN ACCORDANCE WITH THE SUBSCRIPTION — 8B

(56) References Cited

OTHER PUBLICATIONS

Samsung Electronics Co.; "Access control mechanism for MTC devices in GERAN"; 3GPP GERAN #46 WG2; GP-100908; May 18-20, 2010; Jeju Island, South Korea; whole document (3 pages).

Catt; "Discussion on RACH overload for MTC"; 3GPP TSG RAN WG2 Meeting #70; R2-102780; May 10-14, 2010; Montreal, Canada; whole document (3 pages).

Ericsson et al.; "Evaluation of bottlenecks for MTC"; 3GPP TSG RAN WG2 #69bis; R2-102044; Apr. 12-16, 2010; Beijing, P.R. of China; whole document (5 pages).

3GPP TS 22.368 V1.1.1; "$3^{rd}$ Generation Partnership Project; Technical Specification Group Services and System Aspects; Service requirements for machine-type communications; Stage 1 (Release 10)"; Nov. 2009; whole document (23 pages).

3GPP TR 23.888 V1.0.1; "$3^{rd}$ Generation Partnership Project; Technical Specification Group Services and System Aspects; System Improvements for Machine-Type Communications; (Release 11)"; Feb. 2011; whole document (80 pages).

| TB 3 | ENCRYPTED BITS 58 | TSC 26 | ENCRYPTED BITS 58 | TB 3 | GP 8.25 |
|---|---|---|---|---|---|

|← 1 TIME SLOT: 0.577ms →|

FIG.2A PRIOR ART

| TB 8 | SYNCHRONIZATION SEQUENCE 41 | ENCRYPTED BITS 36 | TB 3 | GP 68.25 |
|---|---|---|---|---|

|← 1 TIME SLOT: 0.577ms →|

FIG.2B PRIOR ART

| TB 4 | ENCRYPTED BITS 69 | TSC 31 | ENCRYPTED BITS 69 | TB 4 | GP 10.5 |
|---|---|---|---|---|---|

|← 1 TIME SLOT: 0.577ms →|

FIG.2C PRIOR ART

RANDOM ACCESS DATA CHANNEL FOR MACHINE TYPE COMMUNICATIONS

TECHNICAL FIELD

The exemplary and non-limiting embodiments of this invention relate generally to wireless communication systems, methods, devices and computer programs and, more specifically, relate to data transmission techniques from wireless devices to a wireless communication network.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
AGCH access grant channel
BCCH broadcast control channel
BSC base station controller
BTS base transceiver station
CCCH common control channel
DL downlink (BS to MS)
EDGE enhanced data rates for GSM evolution
eNB evolved node B
GERAN GSM EDGE radio access network
GSM global system for mobile communication
LTE long term evolution of UTRAN (E-UTRAN)
LTE-A LTE advanced
MBMS multimedia broadcast multicast service
MPRACH MBMS packet random access channel
MS mobile station
MTC machine type communications
PBCCH packet BCCH
PRACH physical random access channel, packet random access channel
RACH random access channel
RADCH random access data channel
RADCK random access data channel acknowledge
TBF temporary block flow
UE user equipment
UL uplink (MS to BS)
UTRAN universal terrestrial radio access network Due to its increased importance studies are underway for network enhancements for machine type communications (MTC). The envisaged use cases for MTC devices are manifold: smart metering, e-health, fleet management, bridge monitoring, object and person tracking, theft detection and so forth. It is expected that in the next few years there will be, approximately, 20 MTC devices for each normal mobile phone. This implies that MTC traffic will consume a considerable amount of radio resources and may have the potential to degrade the performance of normal mobile phone traffic. By 2020 there are estimated to be 50 billion devices connected wirelessly to various networks.

A study item has been initiated at GERAN for MTC enhancements for GSM in Release 10. This issue has also been discussed in the standardization of MTC for LTE. The focus on these study items is to cover enhancements for applications requiring rather low data throughput, low cost, low power consumption and wide coverage. One example of such an application are smart meters, which would report status information and measurements of electricity, gas, heat, water, etc., to a central station that gathers this information for charging each user.

In at least some of the MTC applications it is expected that the service provider using the MTC devices, e.g., an electricity utility, would require small messages to be sent in a frequent manner. This could be required when there is the need for this information for controlling electricity grid parameters, e.g., in smart grids. These short and 'instant' messages are not expected to occur in existing networks (e.g., existing cellular-type networks). As a result, problems could arise due to the large signaling overhead that would be generated by the large number of small messages.

It has been shown that signaling channels may be a significant bottleneck when MTC applications start to be widely deployed in GSM networks (GP-100893 *Bottleneck Capacity Comparison for MTC*, Telefon AB LM Ericsson, ST-Ericsson, 3GPP GERAN#46). In some applications there could be a large number of messages created by MTC devices which could overload existing signaling channels and complicate the allocation of data resources. If one assumes that small messages are sent by the MTC devices the signaling overhead would be considerable when compared to the actual raw data being transmitted. This scenario implies the potential existence of an inappropriate and unbalanced usage of available wireless network resources.

A high volume of MTC messages will also degrade the user experience of human subscribers using web browsing and other non-real time services.

In the UL the normal access procedure in GSM is controlled by RACH parameters T and S, as shown in FIG. 1A. Once data traffic is generated in the MS it sends a RACH request after some random period between 0 and T−1. If no AGCH response is received, another request is sent after a random period between S and S+T−1. The retransmission is held until a maximum number of retransmissions M is attempted, or until a valid response in the AGCH is received. If the maximum number of retransmissions is attempted and no response in the AGCH is received the MS may start a cell-reselection procedure.

In LTE a similar procedure is performed as compared to the GSM procedure. In the first stage the MS sends to the eNB a message on PRACH (physical random access channel) which contains a preamble and a cyclic prefix as in FIG. 1(*b*). When the message is correctly decoded a PRACH response is sent from the eNB with a matching preamble, the UL resource and timing advance (TA) information. In a case wherein no response is received the MS attempts a new retransmission, and continues until a successful response is obtained in the DL.

In both of these current cellular technologies there is a limitation on the amount of data that can be transmitted during access bursts. A large guard period is needed for the burst formats for GSM and LTE since there is no information on the timing advance needed for the location of the MS before the access procedure. This is shown in FIG. 2B and FIG. 3 respectively.

For a MTC device that is not connected to a power main, e.g., an MTC device that is battery powered, a high number of access requests and several failed attempts can quickly consume the battery power.

SUMMARY

The foregoing and other problems are overcome, and other advantages are realized, by the use of the exemplary embodiments of this invention.

In one exemplary embodiment of the invention, a method comprises obtaining a subscription for a device to use, for a period of time specified by the subscription, an uplink random access data channel to a wireless communication network; and transmitting bursts containing data on the random access data channel in accordance with the subscription.

In another exemplary embodiment of the invention, an apparatus comprises at least one processor and a memory including computer program code. The memory and computer program code are configured, with the processor, to cause the apparatus at least to obtain a subscription to use, for a period of time specified by the subscription, an uplink random access data channel to a wireless communication network, and to transmit bursts containing data on the random access data channel in accordance with the subscription.

In a further exemplary embodiment of the invention, a method comprises granting a subscription for a device to use, for a period of time specified by the subscription, an uplink random access data channel to a wireless communication network; and receiving bursts containing data on the random access data channel in accordance with the subscription.

In another exemplary embodiment of the invention, an apparatus comprises at least one processor and a memory including computer program code. The memory and computer program code are configured, with the processor, to cause the apparatus at least to grant a subscription for a device to use, for a period of time specified by the subscription, an uplink random access data channel to a wireless communication network, and to receive bursts containing data on the random access data channel in accordance with the subscription.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 2 shows burst formatting for GSM: normal burst (FIG. 2A); access burst (FIG. 2B) and a higher symbol rate burst (FIG. 2C).

DETAILED DESCRIPTION

Figure 1B:
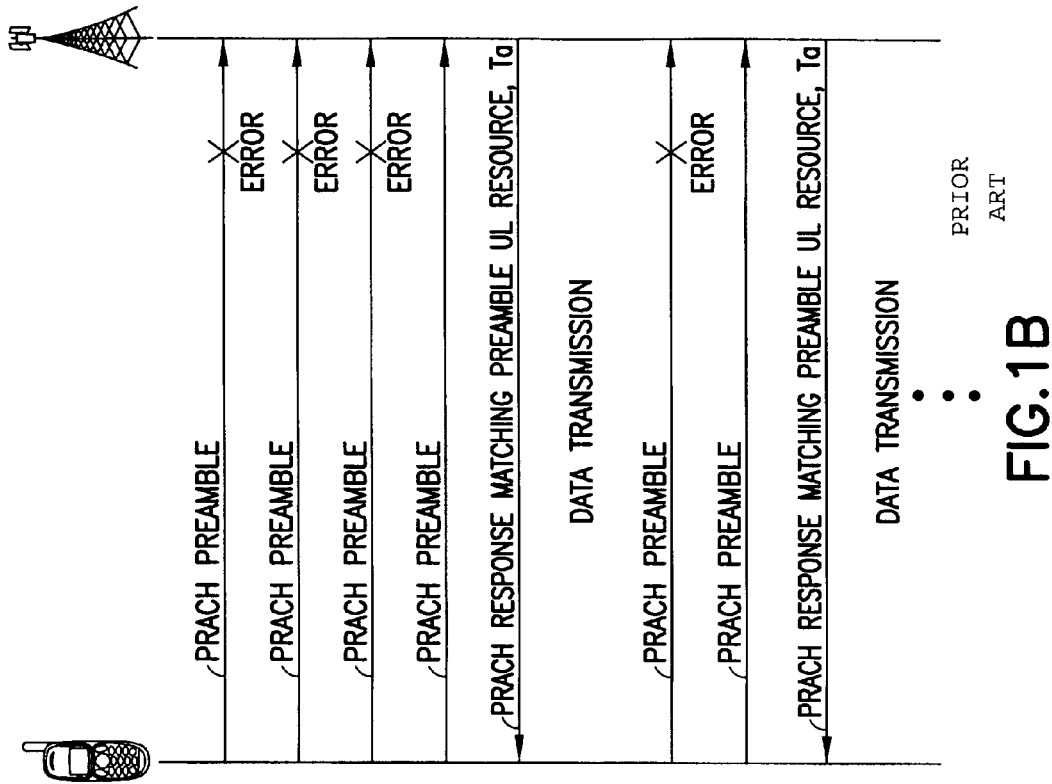
FIG. 1 shows a conventional random access procedure for GSM (FIG. 1A) and LTE (FIG. 1B) technologies.
Figure 1A:
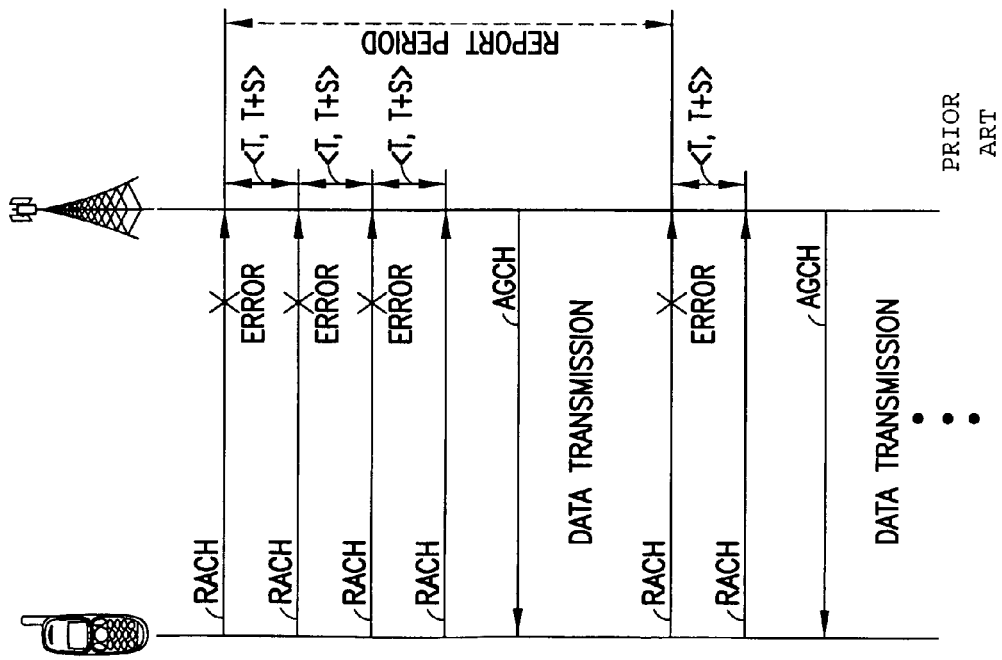
Figure 3A:
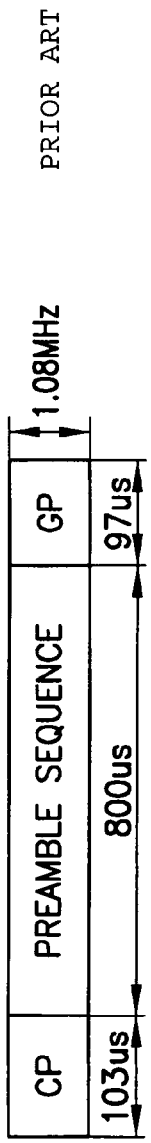
FIG. 3 depicts preamble formats for LTE: Format 0 (FIG. 3A); Format 1 (FIG. 3B); Format 2 (FIG. 3C) and Format 3 (FIG. 3D).
Figure 3B:
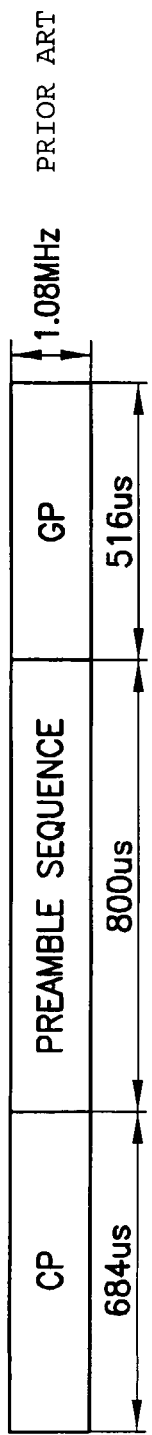
Figure 3C:
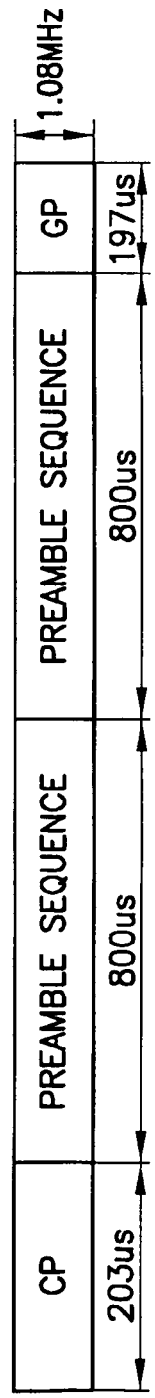
Figure 3D:
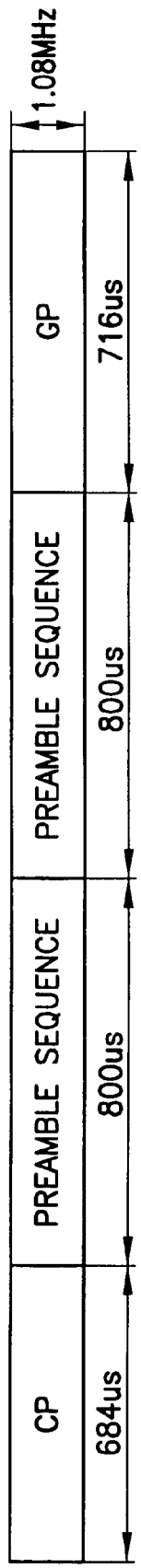

Of interest to the following description are:

3GPP TS 22.368 V10.2.0 (2010-09) Technical Specification $3^{rd}$ Generation Partnership Project; Technical Specification Group Services and System Aspects; Service requirements for Machine-Type Communications (MTC); Stage 1 (Release 10);

3GPP TS 36.211 V10.0.0 (2010-12) Technical Specification 3rd Generation Partnership Project; Technical Specification Group Radio Access Network; Evolved Universal Terrestrial Radio Access (E-UTRA); Physical Channels and Modulation (Release 10), such as section 5.7, Physical random access channel;

3GPP TS 25.214 V10.1.0 (2010-12) Technical Specification 3rd Generation Partnership Project; Technical Specification Group Radio Access Network; Physical layer procedures (FDD) (Release 10), such as section 5.1, Uplink power control, and more specifically section 5.1.1, PRACH; and 3GPP TS 45.001 V9.3.0 (2010-09) Technical Specification $3^{rd}$ Generation Partnership Project; Technical Specification Group GSM/EDGE Radio Access Network; Physical layer on the radio path; General description (Release 9), such as section 7, Coding and interleaving, and more specifically section 7.2.3, Channel coding for the PRACH and MPRACH.

In 3GPP RAN2 there has been some discussion as to whether some of the RACH resources could be reserved for MTC use. However, prior to this invention there has not been a proposal to implement a random access data channel (RADCH) which, when used, would eliminate the need to reserve system resources for dedicated MTC use.

In accordance with the exemplary embodiments the signaling overhead for machine type communications using small messages can be significantly reduced when static MTC devices are considered. By static what is implied are MTC devices having no mobility or only limited mobility. This assumption can be made for applications such as the smart meter, smart grid, and other similar applications requiring the sending of small messages without mobility. In this case it can be assumed that the timing advance (TA) would be substantially constant between subsequent message transmissions; hence the network synchronization process can be simplified. Additionally, since the TA is known before the MTC device attempts to connect to the network there is no need to provide a large guard period (GP) as observed in the conventional access burst formats in FIG. 2B and FIG. 3.

By using the above-mentioned assumptions the exemplary embodiments of this invention provide a random access procedure for static devices sending small messages via a Random Access Data Channel (RADCH).

In accordance with the exemplary embodiments of this invention the RADCH is made available in a cell and its presence can be made known to MTC devices in broadcast system information or by device-specific signaling.

Further in accordance with the exemplary embodiments of this invention the MTC device subscribes to the RADCH. After the subscription is completed the MTC device is able to send RADCH messages.

Further in accordance with the exemplary embodiments of this invention the message that needs to be delivered is sent directly on the RADCH. The transmission on the RADCH uses the TA information from a previous transmission, e.g., when using a normal burst.

In order to increase the probability of correct block reception after a subsequent retransmission, a coding scheme including incremental redundancy can be applied so that the soft bits received from one transmission can be reused to decode the repeated transmission. After the network sends a RADCK (RADCH Acknowledge) message the MTC device is informed that this message has been correctly decoded and can terminate the sending of a retransmission.

If the MTC device performs a cell reselection in Idle mode the RADCH subscription is renewed in the new cell to update the TA value for the MTC device in the new cell.

Figure 7:
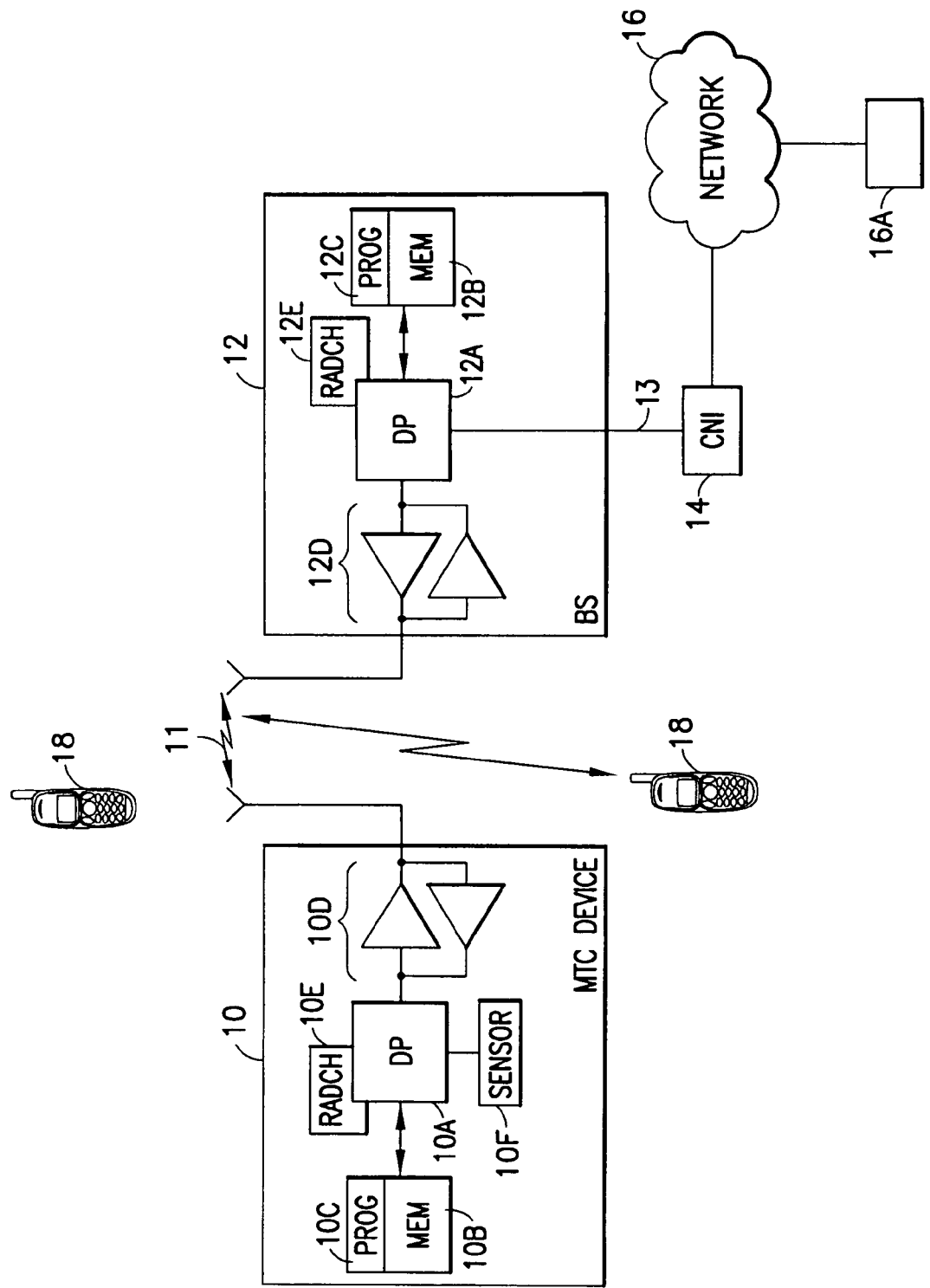
FIG. 7 illustrates a simplified block diagram of various exemplary electronic devices and apparatus that are suitable for use in practicing the exemplary embodiments of this invention.

Before describing in further detail the exemplary embodiments of this invention reference is made to FIG. 7 for illustrating a simplified block diagram of various electronic devices and apparatus that are suitable for use in practicing the exemplary embodiments of this invention. In FIG. 7 a wireless network 1 is adapted for communication over a wireless link 11 with an apparatus, such as a MTC device 10, via a network access node, such as a base station (BS). Depending on the type of wireless network the BS 12 may be referred to as a BTS, as a Node B, or as an eNB. The network 1 includes some type core network infrastructure (CND 14, such as gateways and mobility management entities, that provides connectivity with a further network, such as a telephone network and/or a packet-based, internet protocol (IP) data communications network (e.g., the Internet). The MTC device 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter and receiver pair (transceiver) 10D for bidirectional wireless communications with the BS 12 via one or more antennas. The BS 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The BS 12 is coupled via a data/control path 13 to the CNI 14.

For the purposes of describing the exemplary embodiments of this invention the MTC device 10 can be assumed to also include a RADCH functional unit or module 10E that operates in accordance with the exemplary embodiments of this invention. The BS 12 includes a complementary RADCH functional unit or module 12E that operates in accordance with the exemplary embodiments of this invention. In some embodiments the MTC device 10 can include one or more sensors 10F such as, as non-limiting examples, electrical current sensors, fluid flow sensors and/or temperature/humidity sensors. The data processor 10A is configured to read the sensor 10F and report the reading using the RADCH unit 10E to a desired destination 16A via, for example, the Internet 16. The destination 16A can be, for example, a utility company or, more generally, any consumer of the sensor readings made by the MTC device 10.

The BS 12 can be assumed to establish at least one cell within which the MTC device 10 is located. Within the cell at any given time there can be a number of MTC devices 10, as well as a number of conventional mobile communication devices 18. The devices 18 may be, for example, mobile stations, user equipment, mobile terminals, cellular phones, smart phones, computing devices including PDAs and tablet-based computing devices, gaming devices and, in general, any type of conventional user devices that employ wireless cellular connectivity. The mobile communication devices 18 are capable of establishing and maintaining voice and/or data calls and connections through the BS 12 using conventional cellular transmission and reception protocols, and share the radio spectrum and radio resources with the MTC devices 10.

One exemplary goal of the embodiments of this invention is to minimize the impact of the MTC device(s) 10 on the radio spectrum and radio resources that are also used by the mobile communication devices 18.

Still referring to FIG. 7 the programs 10C and 12C are assumed to include program instructions that, when executed by the associated data processor, enable the MTC device 10 and the BS 12 to operate in accordance with the exemplary embodiments of this invention, as will be discussed below in greater detail. The exemplary embodiments of this invention may be implemented at least in part by computer software executable by the DP 10A of the MTC device 10 and by the DP 12A of the BS12, or by dedicated hardware, or by a combination of software and hardware (and firmware).

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

It should be noted that the MTC device 10 can, in certain embodiments or in certain use situations, be one of the mobile communication devices 18 that (at least temporarily) meets the requirements needed to effectively use the RADCH, such as little or no mobility and data messages to be transmitted of limited size.

The exemplary embodiments of this invention can be implemented at least in GSM and LTE technologies. In either of these technologies the implementation involves modifying the burst format of RACH or PRACH in order to obtain a normal burst format. An increase in the number of available bits in the burst is obtained by decreasing the number of training sequence bits. For example, if the MTC device 10 is stationary then it is possible to assume that the radio channel estimates for a next message to transmit would not differ to a great degree from the radio channel estimates used for the last transmitted message. Thus, the last channel estimation can be used and as a result fewer training sequence bits are needed.

An aspect of the exemplary embodiments is the RADCH subscription. FIG. 4 presents an overview of steps used for a RADCH transmission. In a first step shown in FIG. 4A the MTC device 10 subscribes to the RADCH service. The MTC device 10 may initiate the subscription process by sending a RADCH subscription request. The subscription request can include one or both of an estimation of the periodicity of the RADCH messages and the payload size of each message. The network evaluates the subscription request in order to avoid an overload of RADCH messages caused by too many MTC devices 10 attempting to use the RADCH or messages that are too large.

Figure 4B:
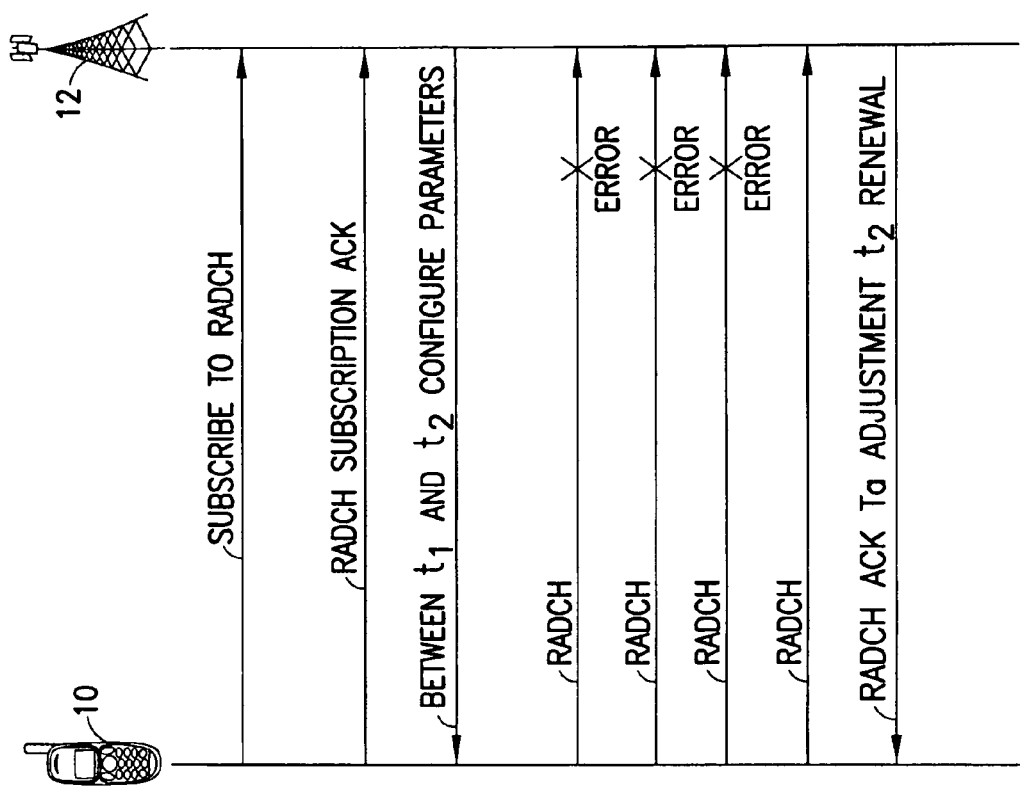
FIG. 4 shows an exemplary random access data channel (RADCH) for static MTC devices: MTC device originated RADCH subscription (FIG. 4A); network originated RADCH subscription (FIG. 4B).
Figure 4A:
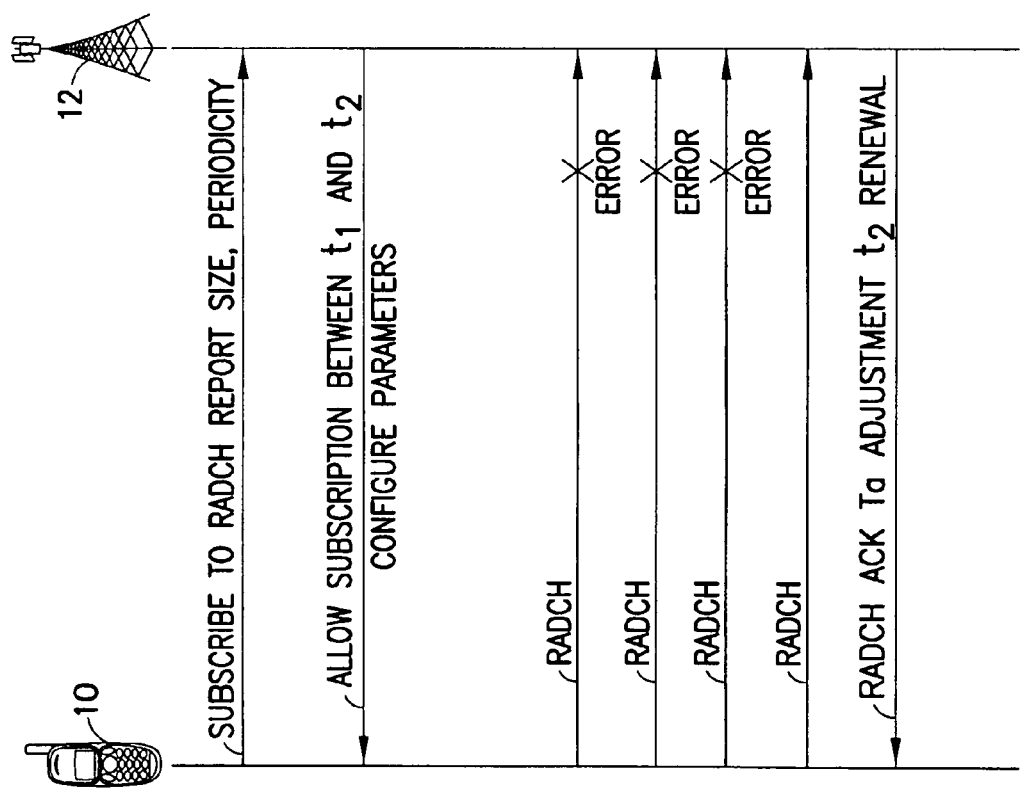

The subscription process may also be initiated by the network as in FIG. 4B. In this case the network can evaluate the behavior of certain devices in order to select good candidates for RADCH transmission. Good candidates for RADCH can include any network-connected devices, such as the MTC devices 10, that have sent only small messages, and whose TA values have not varied by more than some threshold amount. The network then sends a message for the MTC device 10 being subscribed to. The MTC device 10 acknowledges to confirm the subscription request, and the subscription is finalized by a message sent to the MTC device 10 with the RADCH parameters, channel parameters, timing advance, and a time over which the subscription is valid (indicated in FIGS. 4A and 4B by t1 and t2).

The subscription process can be implemented during a data transmission, which would avoid overloading other data channels, as well as by using common signaling channels.

After the subscription process is completed the MTC device 10 is able to send RADCH messages to the network.

It can be noted that any IP connection details can also be shared during the subscription phase. This enables the RADCH message header to be simplified, since the information for the destination IP address is fixed in many applications of interest. For example, in FIG. 7 the MTC device 10 may be sending small data messages only to an IP address associated with an electric utility or some other consumer of the data 16A. In this case the IP destination address for subsequent data messages can be established during the subscription phase, and the MTC device 10 is not required to send the IP destination address in each RADCH transmission, thereby freeing up additional room for data bits, or simply reducing the signaling overhead.

With regard to the transmission process, after the MTC device 10 has subscribed to RADCH it sends a message that includes authentication information, in addition to the data, coded in a burst format that can be similar to that used in normal burst transmissions (e.g., see FIGS. 2 and 3). In the RADCH case there can be smaller guard period (GP) (e.g., reduced GP, no GP, no guard times) meaning that the number of bits conveyed by the burst can be increased. After each RADCH transmission the MTC device 10 waits for a network response in a RADCK ACK message. If this is not received the MTC device 10 attempts a new RADCH transmission, using the same raw information as in the last transmitted RADCH burst. The RADCK ACK message can include information for adapting the MTC device 10 to new (changing) channel conditions. This information can be used, for example, to specify an increase or a decrease in the channel coding robustness and/or a TA correction. Additionally, the network may automatically renew the RADCH subscription during RADCH ACK message by sending a new value of t2.

In the RADCH response the network acknowledges the receipt of the RADCH burst. At this point the network can indicate a new time for validity of the RADCH subscription t2, which is equivalent to renewing the current RADCH subscription. Additionally, parameters related to a maximum number of retransmissions Mt, and to a modulation coding scheme (MCS) can be included.

The MTC device 10 can send RADCH on all BCCH slots dedicated for RACH or RADCH. In case the PBCCH (or an equivalent) channel is available, the MTC device 10 can prioritize this channel. Additionally, if a slot for a MTC hybrid channel (e.g., see GP-101879, Hybrid MTC Channel, Nokia Siemens Networks, Nokia Corporation, 3GPP GERAN#48) is available, RADCH messages can use this slot.

Briefly, the concept behind the hybrid MTC channel is to alleviate the risk of network overload situations for increased penetration of MTC devices. It occupies a specific timeslot (PDCH) of the BCCH carrier. Timeslot 7 is chosen due to the fact that timeslots 2, 4 and 6 may be in use because of multiple BCCH/CCCH, and timeslots 1 and 2 may be occupied by RACH if the cell radius exceeds 35 km. The purpose of the hybrid MTC channel is to serve both MTC devices in idle mode and during channel access phase, as well as mobile terminals or MTC devices with a dedicated packet data connection at the same time. This is done dynamically to ensure varying load from MTC devices over the day is taken into account.

In order to achieve this segregation, the resource on hybrid MTC channel is split into a resource for common control channels used by MTC devices (e.g. MCCCH) and resource used for packet data traffic. Hence the hybrid MTC channel is basically a PDCH on which is mapped MCCCH, PDTCH and PACCH. The resource split is defined by a resource allocation bitmap signalled by the BTS indicating when the hybrid MTC channel is reserved for packet data traffic (PDTCH and PACCH) and when it is reserved for MCCCH used by MTC devices only. The resource allocation bitmap is periodically updated and valid for a predefined time interval, which is signalled along with the bitmap. The presence of the hybrid MTC channel and its allocation is indicated in specific system information messages on the BCCH carrier.

Figure 5B:
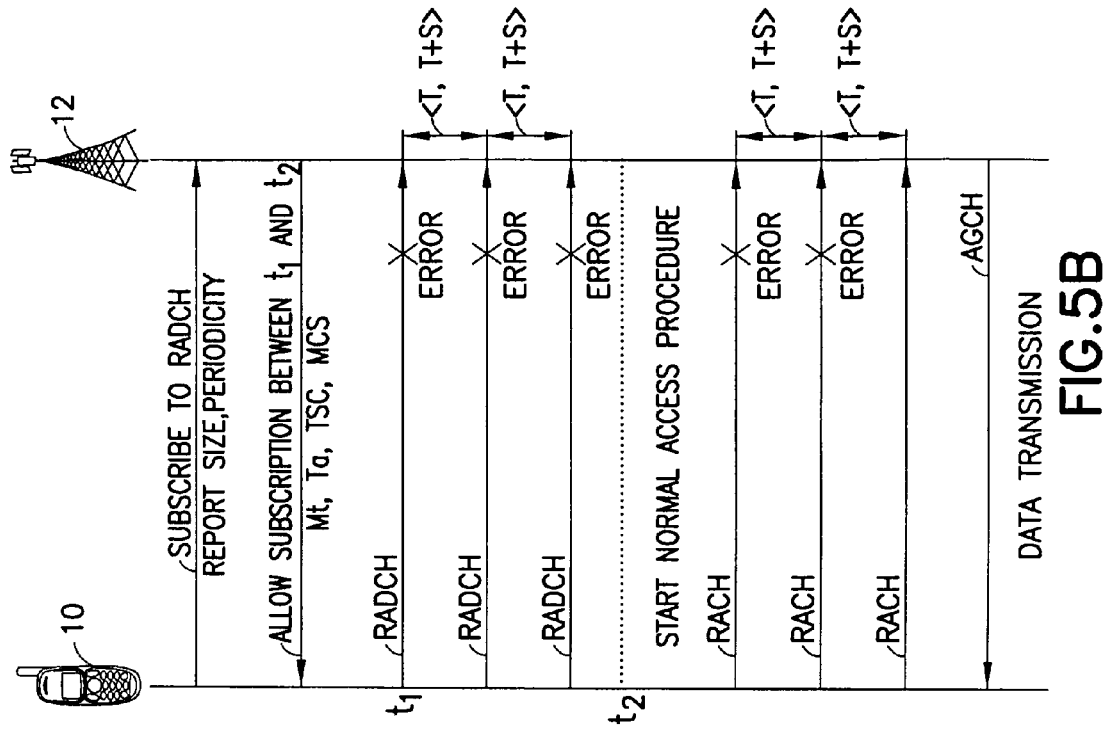
FIG. 5 illustrates RADCH timing diagrams for an exemplary GSM implementation: successful RADCH transmission after 4 attempts (FIG. 5A); normal access procedure started after an excessive number of RADCH have failed, or after allowed time for RADCH transmission has expired (FIG. 5B).
Figure 5A:
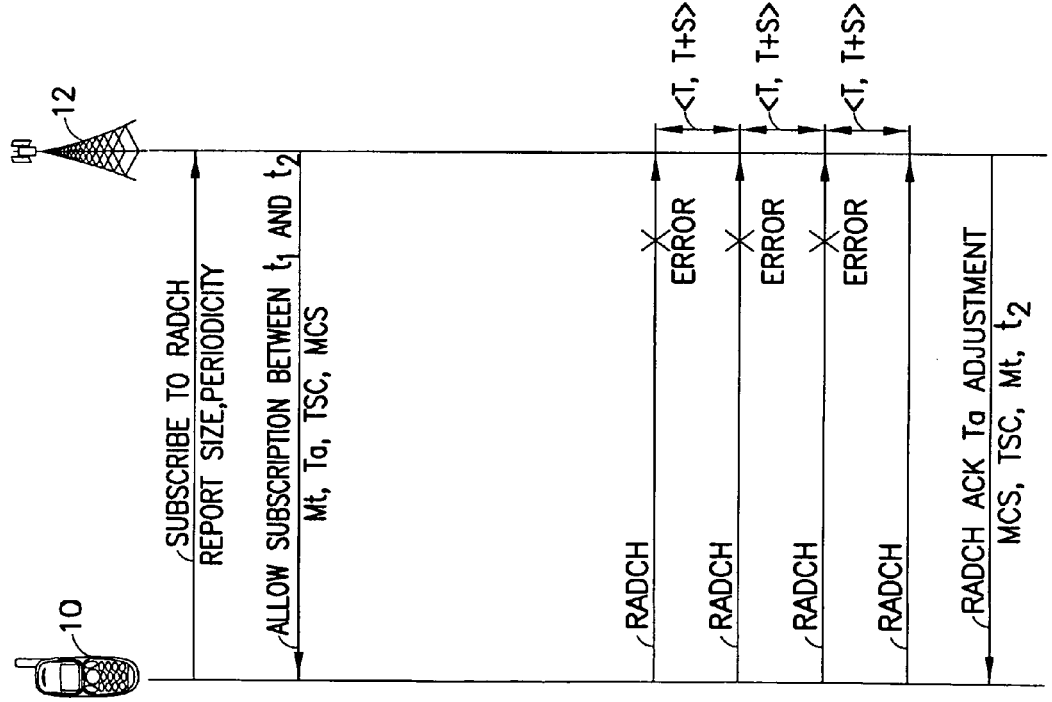

Returning now to the description of the RADCH, the RADCH retransmissions preferably take place in a similar manner as those used for RACH. After the first RADCH transmission, the MTC device 10 waits some random number of time slots, between S and S+T. If no RADCH response is received, the MTC device 10 attempts to retransmit the RADCH block (which can be coded using an incremental redundancy scheme). This process is continued until one of: a successful RADCH response is obtained in the DL, as shown in FIG. 5A; the maximum number of retransmissions Mt is reached; or until the maximum allowed time for RADCH t2 occurs as in FIG. 5B. The S and T parameters can be reused from the random access procedure, Mt can be determined in the network side based at least on the radio conditions of the MTC device 10, as well as a probability for the MTC device 10 to overload signaling channels with erroneous RADCH transmissions.

In order to avoid multiple erroneous RADCH retransmissions, which could be caused by, for example, several consecutive collisions or a change in propagation conditions affecting the TA, there is preferably an upper limit for subsequent RADCH transmissions. If this upped limit is reached the MTC device 10 begins the normal random access procedure (e.g., a normal GSM or LTE random access procedure depending on the specifics of the cellular network) and can attempt to subscribe (re-subscribe) to the RADCH after some period of time has elapsed.

In a case wherein the time limit t2 for RADCH transmission for a given MTC device 10 is reached without being renewed by the network the MTC device 10 terminates RADCH transmission and begins a normal random access procedure (e.g., a normal GSM or LTE random access procedure). In case there is no urgent message to be sent shortly after t2, the MTC device 10 may request a new subscription to the RADCH before sending a new message.

The RADCH procedure for the exemplary GSM implementation is presented in FIG. 5. In this case the subscription process can occur either in the common control channel (CCCH), or during a TBF with ongoing traffic for the MTC device 10. During the subscription procedure the network informs the MTC device 10 of the TA value, the modulation and coding scheme (MCS) to be applied, the training sequence, as well as authentication information. Additionally, since it can be assumed that the MTC device 10 is static, a power reduction can be assigned to avoid interference in other cells.

Discussed now is RADCH-specific power control. In general power reduction can be an important issue for RADCH transmission. In the case of RADCH a power control algorithm can be modified or designed in order to artificially set some priority for RACH bursts over RADCH bursts. If some power reduction is assigned for RADCH bursts the probability of correctly decoding a RACH burst is increased when the RACH burst is sent by one of the MSs 18 simultaneously with a RADCH burst by the MTC device 10. Additionally, in a case of a collision of two RADCH bursts the probability of correctly decoding both bursts is increased if they are received with the same power and the BS 12 has the capability of decoding two simultaneous signals. In some exemplary embodiments, power control over the RADCH includes further control over the priority of the RADCH over RACH messages, for example, such that lower priority of RADCH messages leads to an artificial priority (e.g., an automatic, increased priority) of RACH messages over RADCH messages.

In some exemplary embodiments, the device is in idle mode. In other exemplary embodiments, transmitting a burst comprises waiting to receive an acknowledgement from the wireless communication network that the burst was correctly received, and if the acknowledgement is not received after some period of time, and until a maximum number of allowable re-transmissions are made, delaying a random period of time and re-transmitting the burst, wherein a received acknowledgment comprises information for renewing the subscription for an additional period of time. In further exemplary embodiments, the transmitted bursts do not have a guard period. In other exemplary embodiments, the transmitted bursts comprise first bursts, the method further comprising: transmitting second bursts containing data on a random access channel, wherein the first bursts have a first priority that is established using first power control, wherein the second bursts have a second priority that is established using second power control, wherein a lower priority for the first priority yields a higher priority for the second priority.

In one exemplary embodiment, a non-transitory computer-readable medium that contains software program instructions, wherein execution of the software program instructions by at least one data processor results in performance of operations that comprise execution of any one of the methods described herein.

In another exemplary embodiment, a computer program product comprising a computer-readable medium bearing computer program code embodied therein for use with a computer, execution of the computer program code comprising operations in accordance with any one of the methods described herein.

Additional modifications can be made if the exemplary embodiments of this invention are used in conjunction with the above-mentioned MTC hybrid channel in GERAN. In this case resources available for RACH channel can allocate some fixed share for RADCH, which would avoid the impact of RADCH retransmissions over normal RACH.

Figure 6:
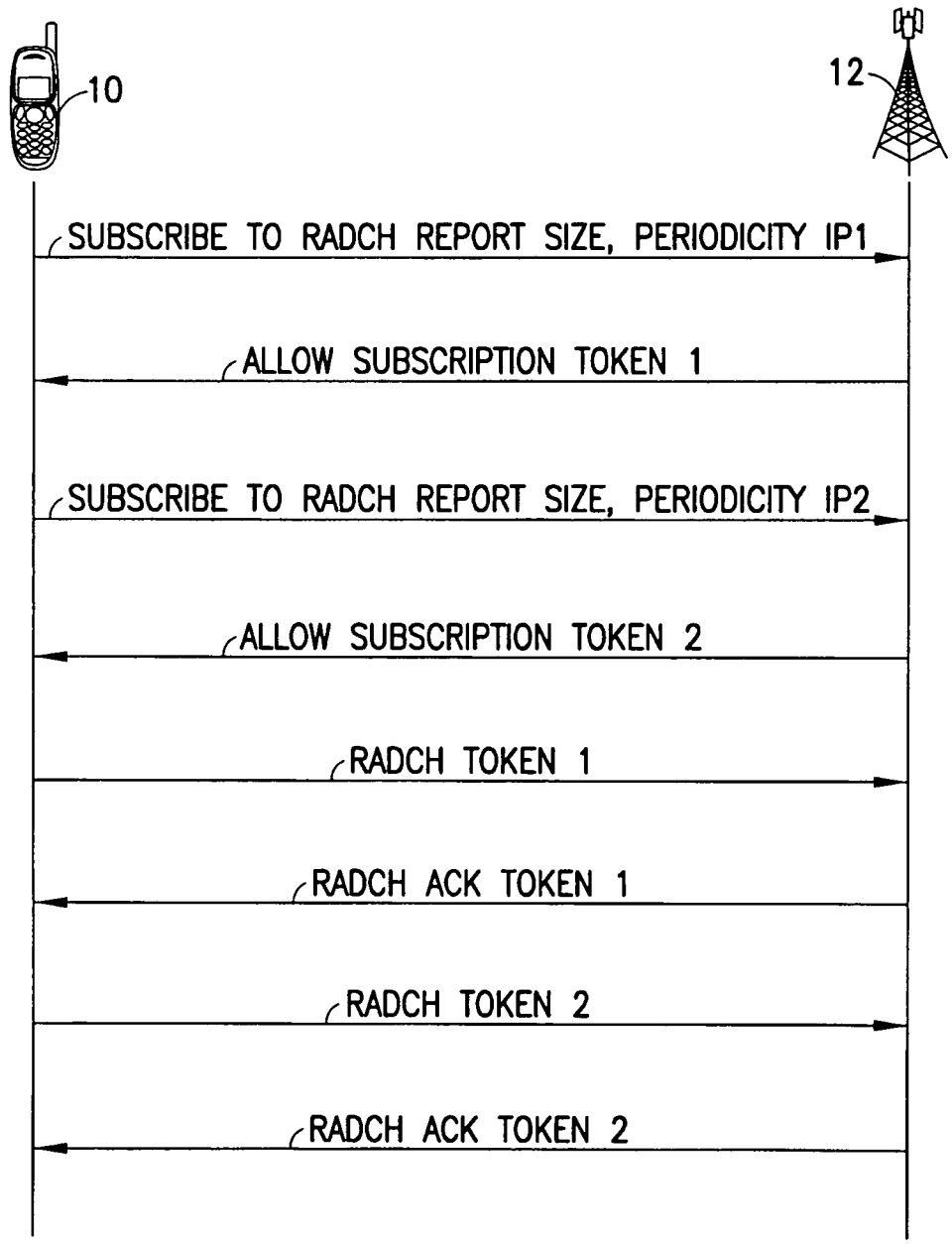
FIG. 6 illustrates an exemplary procedure used when the MTC device connects to multiple IP addresses.

Discussed now is the connection to multiple IP destinations. FIG. 6 shows various implementation details to enable handling multiple IPs for the same MTC device 10. This can be useful for, by example, a data concentrator that send reports for different MTC servers, and furthermore adds flexibility for non-MTC applications.

In this case the network provides a token identifying a connection between the MTC device 10 and the destination IP address during the subscription procedure. When a connection is needed with a different destination IP address, the MTC device 10 subscribes again to the RADCH feature, indicating the second destination IP. The network responds with a different connection token to identify the second connection. During the RADCH transmission phase the MTC device 10 includes the token for the desired connection in the RADCH message header, and the network includes the corresponding token in the RADCH ACK response. The use of the token (which can be just a few bits) enables the MTC device 10 to send data to a variety of different destination servers 16A without having to include the entire IP destination address in each RADCH burst.

Based on the foregoing it should be apparent that the exemplary embodiments of this invention provide a method, apparatus and computer program(s) to enable a radio resource and power efficient machine type communications data transport mechanism in a cellular communication system.

The use of the exemplary embodiments provides a number of technical effects and advantages. For example, the implementation of the RADCH techniques in GSM avoids additional complexity during the access procedure for stationary devices sending small messages. Furthermore, when transmit power reduction is enabled for the RADCH message the additional latency of normal traffic caused by RACH overload by MTC devices can be avoided. In this case, the normal RACH messages would have a higher probability of being received and correctly decoded. Further, the overall latency for transmitting small messages is reduced. For example, messages can be successfully delivered in less time than would be required to perform a conventional access procedure. Furthermore, the use of RADCH avoids the added complication of allocating resources when several devices are trying to transmit small messages in a nearly simultaneous manner. In addition, the conventional and complex RACH to AGCH process can be avoided when simply transmitting some small amount of information, such as status information. In addition, the RADCH procedures can be implemented in network components and in devices 10 by a software upgrade, as no hardware modifications are needed.

Figure 8:
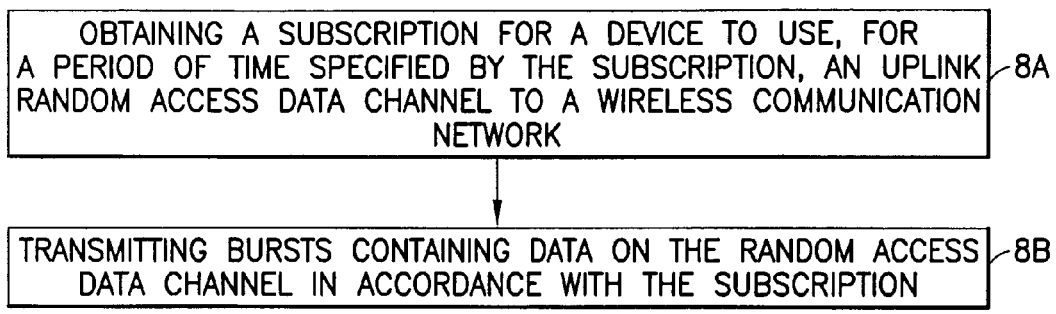
FIG. 8 is a logic flow diagram that illustrates the operation of an exemplary method, and a result of execution of computer program instructions embodied on a computer readable medium, in accordance with the exemplary embodiments of this invention.

FIG. 8 is a logic flow diagram that illustrates the operation of a method, and a result of execution of computer program instructions, in accordance with the exemplary embodiments of this invention. In accordance with these exemplary embodiments a method performs, at Block 8A, a step of obtaining a subscription for a device to use, for a period of time specified by the subscription, an uplink random access data channel to a wireless communication network. At Block 8B there is a step of transmitting bursts containing data on the random access data channel in accordance with the subscription.

A method as above, wherein obtaining a subscription is initiated by one of the device sending a subscription request and the wireless communication network. A method as in any above, wherein obtaining a subscription is initiated by the device sending a subscription request. A method as in any above, wherein obtaining a subscription is initiated by the wireless communication network. A method as in any above, wherein the subscription request comprises information specifying how often the device will transmit a burst and an amount data that will be transmitted in each burst. A method as in any above, wherein obtaining a subscription is initiated by the wireless communication network.

A method as in any above, wherein the device is in idle mode. A method as in any above, wherein obtaining a subscription comprises receiving subscription parameters comprising parameters that specify at least one of the period of time that the subscription is valid, a timing advance, a modulation coding scheme, a transmit power level for the uplink random access data channel, authentication-related information, a maximum number of re-transmissions of a burst that are permitted, and information descriptive of a duration of a guard period in each burst. A method as in any above, wherein transmitting a burst comprises waiting to receive an acknowledgement from the wireless communication network that the burst was correctly received, and if the acknowledgement is not received after some period of time, and until a maximum number of allowable re-transmissions are made, delaying a random period of time and re-transmitting the burst.

A method as in any above, wherein a received acknowledgment comprises information for renewing the subscription for an additional period of time. A method as in any above, wherein the transmitted bursts do not have a guard period. A method as in any above, wherein obtaining a subscription comprises sending a destination address for the data, receiving a token from the wireless communication network that is associated with the destination address, and wherein each burst that is transmitted that contains data for that destination address comprises the token, and wherein an acknowledgement of the successful reception of the burst also includes the token. A method as in any above, wherein the transmitted bursts comprise first bursts, the method further comprising: transmitting second bursts containing data on a random access channel, wherein the first bursts have a first priority that is established using first power control, wherein the second bursts have a second priority that is established using second power control, wherein a lower priority for the first priority yields a higher priority for the second priority.

A method as in any above, wherein the first bursts have a first burst class and the second bursts have a second burst class of a plurality of burst classes, wherein a burst class k of the plurality of burst classes has a k-th priority that is established using a k-th power control, wherein a lower priority for one burst class yields a higher priority for at least one other burst class, wherein adjusting the power controls of the plurality of burst classes yields relative priority among said plurality of burst classes. A method as in any above, wherein a lower priority for one burst class yields a higher priority for all of the other burst classes. A method as in any above, further comprising one or more additional aspects of the exemplary embodiments of the invention as described herein.

A computer program product comprising a computer-readable medium bearing computer program code embodied therein for use with a computer, execution of the computer program code comprising the method (e.g., the steps of the method) as in any one of the above methods.

A non-transitory computer-readable medium that contains software program instructions, wherein execution of the software program instructions by at least one data processor results in performance of operations that comprise execution of the method (e.g., the steps of the method) as in any one of the above methods.

In another exemplary embodiment, a computer program product comprising a computer-readable medium bearing computer program code embodied therein for use with a computer, execution of the computer program code comprising: code for obtaining a subscription for a device to use, for a period of time specified by the subscription, an uplink random access data channel to a wireless communication network; and code for transmitting bursts containing data on the random access data channel in accordance with the subscription.

Figure 9:
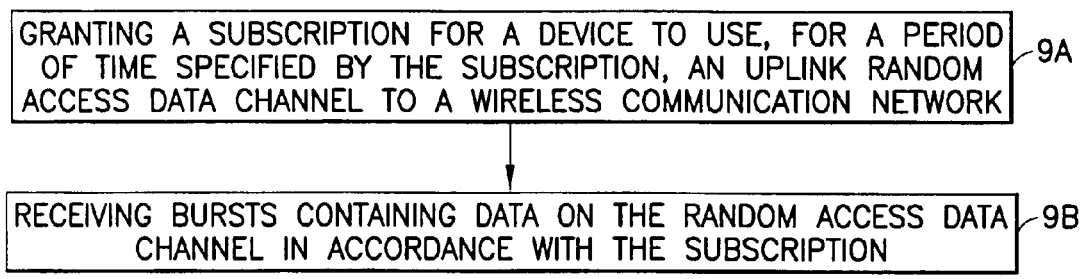
FIG. 9 is a logic flow diagram that illustrates the operation of an exemplary method, and a result of execution of computer program instructions embodied on a computer readable medium, further in accordance with the exemplary embodiments of this invention.

FIG. 9 is a logic flow diagram that illustrates the operation of a method, and a result of execution of computer program instructions, in accordance with the exemplary embodiments of this invention. In accordance with these exemplary embodiments a method performs, at Block 9A, a step of granting a subscription for a device to use, for a period of time specified by the subscription, an uplink random access data channel to a wireless communication network. At Block 9B there is a step of receiving bursts containing data on the random access data channel in accordance with the subscription.

A method as above, wherein granting the subscription is initiated by a receipt of a subscription request from the device. A method as in any above, wherein the received subscription request comprises information specifying how often the device will transmit a burst and an amount data that will be transmitted in each burst. A method as in any above, wherein granting the subscription is initiated by the wireless communication network and comprises identifying devices that potentially can use the random access data channel, wherein identifying comprises determining a device or devices that have no or limited mobility and that transmit a limited amount of data.

A method as in any above, wherein granting the subscription comprises transmitting to the device subscription parameters comprising parameters that specify at least one of the period of time that the subscription is valid, a timing advance, a modulation coding scheme, a transmit power level for the uplink random access data channel, authentication-related information, a maximum number of re-transmissions of a burst that are permitted, and information descriptive of a duration of a guard period in each burst. A method as in any above, wherein receiving a burst comprises transmitting an acknowledgement to the device if the burst was correctly received and, if not, receiving at least one re-transmission of the burst until a maximum number of allowable re-transmissions is received. A method as in any above, wherein the transmitted acknowledgment comprises information for renewing the subscription for an additional period of time.

A method as in any above, wherein granting a subscription comprises receiving a destination address for the data, assigning a token that is associated with the destination address, transmitting the token to the device, wherein each received burst that contains data for that destination address comprises the token, and further comprising sending the data received in a burst in an internet protocol packet that contains the destination address, and sending an acknowledgement of the successful reception of the burst to the device, wherein the acknowledgement also includes the token. A method as in any above, wherein granting a subscription assigns a transmit power level to be used when transmitting a burst on the random access data channel, and wherein assigned transmit power level is selected to be less than a transmit power level used when other devices transmit a burst on a random access channel. A method as in any above, further comprising one or more additional aspects of the exemplary embodiments of the invention as described herein.

A computer program product comprising a computer-readable medium bearing computer program code embodied therein for use with a computer, execution of the computer program code comprising the method (e.g., the steps of the method) as in any one of the above methods.

A non-transitory computer-readable medium that contains software program instructions, wherein execution of the software program instructions by at least one data processor results in performance of operations that comprise execution of the method (e.g., the steps of the method) as in any one of the above methods.

In another exemplary embodiment, a computer program product comprising a computer-readable medium bearing computer program code embodied therein for use with a computer, execution of the computer program code comprising: code for granting a subscription for a device to use, for a period of time specified by the subscription, an uplink random access data channel to a wireless communication network; and code for receiving bursts containing data on the random access data channel in accordance with the subscription.

The various blocks shown in FIGS. 8 and 9 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN and GSM systems, it should be appreciated that the exemplary embodiments of this invention are not limited for use with only these particular types of wireless communication systems, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., t1, t2, TA, Mt, etc.) are not intended to be limiting in any respect, as these parameters may be identified by any suitable names. Further, the various names assigned to different channels (e.g., AGCH, CCCH, PRACH, RADCH, RADCK, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
sending a request from a machine-type communications device for a subscription to communicate via an uplink random access data channel to a network access node of a wireless communication network for use by the machine-type communications device, said request including at least one of an estimation of a periodicity of bursts to be sent on the uplink random access data channel and the size of each burst;
obtaining said subscription to use said uplink random access data channel for a period of time specified by said subscription from said network access node; and
transmitting bursts containing data on said uplink random access data channel to said network access node within said specified period of time in accordance with said subscription,
wherein, when obtaining said subscription to said random access data channel, subscription parameters are received by said machine-type communications device, said subscription parameters comprising parameters specifying at least one of the period of time that said subscription is valid, a timing advance, a modulation coding scheme, a transmit power level for the uplink random access data channel, authentication-related information, a maximum number of re-transmissions of a burst that are permitted, and information descriptive of a duration of a guard period in each burst.

2. The method of claim 1, wherein obtaining said subscription is initiated by the machine-type communications device by sending a subscription request and wherein the subscription request comprises information specifying how often the device will transmit a burst and an amount of data that will be transmitted in each burst.

3. A computer program product comprising a computer-readable medium bearing computer program code embodied therein for use with a computer, the computer program code comprising code for performing at least the following:
sending a request by from a machine-type communications device for a subscription to communicate via an uplink random access data channel to a network access node of a wireless communication network for use by the machine-type communications device, said request including at least one of an estimation of a periodicity of bursts to be sent on the uplink random access data channel and the size of each burst;
obtaining said subscription to use said uplink random access data channel for a period of time specified by said subscription from said network access node; and transmitting bursts containing data on said uplink random access data channel to said network access node within said specified period of time in accordance with said subscription, wherein, when obtaining said subscription to said random access data channel, subscription parameters are received by said machine-type communications device, said subscription parameters comprising parameters specifying at least one of the period of time that said subscription is valid, a timing advance, a modulation coding scheme, a transmit power level for the uplink random access data channel, authentication-related information, a maximum number of re-transmissions of a burst that are permitted, and information descriptive of a duration of a guard period in each burst.

4. An apparatus comprising:

at least one processor; and a memory including computer program code, wherein the memory and computer program code are configured, with the processor, to cause the apparatus at least to:

send a request for a subscription to communicate via an uplink random access data channel to a network access node of a wireless communication network for use by the machine-type communications device, said request including at least one of an estimation of a periodicity of bursts to be sent on the uplink random access data channel and the size of each burst;

obtain said subscription to use said uplink random access data channel for a period of time specified by the subscription from said network access node; and transmit bursts containing data on said uplink random access data channel to said network access node within said specified period of time in accordance with said subscription, wherein, when obtaining said subscription to said random access data channel, said at least one processor receives subscription parameters comprising parameters specifying at least one of the period of time that said subscription is valid, a timing advance, a modulation coding scheme, a transmit power level for the uplink random access data channel, authentication-related information, a maximum number of re-transmissions of a burst that are permitted, and information descriptive of a duration of a guard period in each burst, and wherein said apparatus is a machine-type communications device.

5. The apparatus of claim 4, wherein obtaining said subscription to use comprises one of the at least one processor sending a subscription request and the wireless communication network initiating said obtaining.

6. The apparatus of claim 5, wherein the subscription request comprises information specifying how often the apparatus will transmit a burst and an amount of data that will be transmitted in each burst.

7. The apparatus as in claim 4, wherein the transmitted bursts do not have a guard period.

8. The apparatus as in claim 4, wherein after transmitting a burst the at least one processor waits to receive an acknowledgement from the network access node of the wireless communication network that the burst was correctly received, and when the acknowledgement is not received after some period of time, and until a maximum number of allowable re-transmissions are made, delays a random period of time and re-transmits the burst.

9. The apparatus as in claim 4, wherein said at least one processor, when obtaining said subscription to the random access data channel, sends a destination address for the data and receives a token from the network access node of the wireless communication network, said token being associated with the destination address, and wherein each burst that is transmitted that contains data for that destination address comprises the token and wherein an acknowledgement of the successful reception of the burst also includes the token.

10. The apparatus as in claim 4, wherein the transmitted bursts comprise first bursts, and wherein the memory and computer program code are further configured, with the processor, to cause the apparatus to transmit second bursts containing data on a random access channel, wherein the first bursts have a first priority that is established using first power control, wherein the second bursts have a second priority that is established using second power control, wherein a lower priority for the first priority yields a higher priority for the second priority.

11. The apparatus of claim 10, wherein the first bursts have a first burst class and the second bursts have a second burst class of a plurality of burst classes, wherein a burst class k of the plurality of burst classes has a k-th priority that is established using a k-th power control, wherein a lower priority for one burst class yields a higher priority for at least one other burst class, wherein adjusting the power controls of the plurality of burst classes yields relative priority among said plurality of burst classes.

12. A method comprising:

sending a message including a subscription request to communicate via an uplink random access data channel by a network access node to a machine-type communications device, said request including at least one of an estimation of a periodicity of bursts to be sent on the uplink random access data channel and the size of each burst;

receiving an acknowledgement from said machine-type communications device confirming the subscription request;

granting a subscription to communicate via said uplink random access data channel for said machine-type communications device to use, for a period of time specified by the subscription, said uplink random access data channel to the network access node of a wireless communication network, said network access node having evaluated said request in order to avoid an overload of messages on said uplink random access data channel; and receiving bursts containing data on said uplink random access data channel from said machine-type communications device within said specified period of time in accordance with said subscription, wherein, when granting the subscription, subscription parameters are transmitted to the machine-type communications device, said subscription parameters comprising parameters specifying at least one of the period of time that the subscription is valid, a timing advance, a modulation coding scheme, a transmit power level for the uplink random access data channel, authentication-related information, a maximum number of re-transmissions of a burst that are permitted, and information descriptive of a duration of a guard period in each burst.

13. An apparatus comprising:

at least one processor; and a memory including computer program code, wherein the memory and computer program code are configured, with the processor, to cause the apparatus at least to:

send a message including a subscription request to communicate via an uplink random access data channel to a machine-type communications device, said request including at least one of an estimation of a periodicity of bursts to be sent on the uplink random access data channel and the size of each burst;

receive an acknowledgement from said machine-type communications device confirming the subscription request;

grant a subscription to communicate via said uplink random access data channel for said machine-type communications device to use, for a period of time specified by the subscription, said uplink random access data channel; and receive bursts containing data on said uplink random access data channel from said machine-type communications device within said specified period of time in accordance with said subscription, wherein said at least one processor, when granting the subscription, transmits to the machine-type communications device subscription parameters comprising parameters specifying at least one of the period of time that the subscription is valid, a timing advance, a modulation coding scheme, a transmit power level for the uplink random access data channel, authentication-related information, a maximum number of re-transmissions of a burst that are permitted, and information descriptive of a duration of a guard period in each burst, and wherein said apparatus is a network access node, said network access node having evaluated said request in order to avoid an overload of messages on said uplink random access data channel.

14. The apparatus of claim 13, wherein said at least one processor grants the subscription in response to a receipt of a subscription request from the machine-type communications device and wherein the subscription request comprises information specifying how often the device will transmit a burst and an amount of data that will be transmitted in each burst.

15. The apparatus as in claim 13, wherein said at least one processor initiates the granting of the subscription by identifying devices that potentially can use the random access data channel by determining a machine-type communications device or devices that have no or limited mobility and that transmit a limited amount of data.

16. The apparatus as in claim 13, wherein said at least one processor in response to correctly receiving a burst transmits an acknowledgement to the machine-type communications device and, when the burst is not correctly received, receives at least one re-transmission of the burst until a maximum number of allowable re-transmissions is received.

17. The apparatus as in claim 13, wherein said at least one processor when granting said subscription assigns a transmit power level to be used when transmitting a burst on the random access data channel, and wherein assigned transmit power level is selected to be less than a transmit power level used when other devices transmit a burst on a random access channel.

18. An apparatus comprising:
at least one processor; and
a memory including computer program code, wherein the memory and computer program code are configured, with the processor, to cause the apparatus at least to:
receive a request for a subscription to communicate via an uplink random access data channel from a machine-type communications device, said request including at least one of an estimation of a periodicity of bursts to be sent on the uplink random access data channel and the size of each burst;

grant the subscription to communicate via said uplink random access data channel for said machine-type communications device to use, for a period of time specified by the subscription, said uplink random access data channel; and receive bursts containing data on said uplink random access data channel from said machine-type communications device within said specified period of time in accordance with said subscription, wherein said at least one processor, when granting the subscription, transmits to the machine-type communications device subscription parameters comprising parameters specifying at least one of the period of time that the subscription is valid, a timing advance, a modulation coding scheme, a transmit power level for the uplink random access data channel, authentication-related information, a maximum number of re-transmissions of a burst that are permitted, and information descriptive of a duration of a guard period in each burst, and wherein said apparatus is a network access node, said network access node having evaluated said request in order to avoid an overload of messages on said uplink random access data channel.

* * * * *

UNITED STATES PATENT AND TRADEMARK OFFICE
CERTIFICATE OF CORRECTION

| | | |
|---|---|---|
| PATENT NO. | : 9,345,048 B2 | |
| APPLICATION NO. | : 13/065873 | |
| DATED | : May 17, 2016 | |
| INVENTOR(S) | : Rafael Cauduro Dias Paiva, Robson Domingos Vieira and Mikko Saily | |

It is certified that error appears in the above-identified patent and that said Letters Patent is hereby corrected as shown below:

In Claim 3:

Column 14, line 57, "request by" should be deleted and --request-- should be inserted.

Signed and Sealed this
Ninth Day of August, 2016

Michelle K. Lee
*Director of the United States Patent and Trademark Office*